United States Patent [19]
Palmer et al.

[11] Patent Number: 5,915,549
[45] Date of Patent: Jun. 29, 1999

[54] DETACHABLE MODULE DISC AND FLAT OBJECT STORAGE SYSTEM

[75] Inventors: Peter J. Palmer; Christopher G. Palmer, both of Saratoga; Steven A. Gelphman, San Jose, all of Calif.

[73] Assignee: The Mead Corporation, Dayton, Ohio

[21] Appl. No.: 09/029,890

[22] PCT Filed: Jan. 3, 1997

[86] PCT No.: PCT/US97/00022

§ 371 Date: Mar. 10, 1998

§ 102(e) Date: Mar. 10, 1998

[87] PCT Pub. No.: WO97/25715

PCT Pub. Date: Jul. 17, 1997

Related U.S. Application Data

[60] Provisional application No. 60/009,597, Jan. 4, 1996.

[51] Int. Cl.⁶ .................................................... B65D 85/57
[52] U.S. Cl. ........................ 206/308.1; 206/232; 206/311
[58] Field of Search .................................. 206/307, 307.1, 206/308.1, 309–313, 387.13, 232

[56] References Cited

U.S. PATENT DOCUMENTS

| | | |
|---|---|---|
| D. 258,897 | 4/1981 | Glaubinger . |
| D. 300,148 | 3/1989 | Osofsky et al. . |
| D. 303,042 | 8/1989 | Mackey . |
| D. 323,428 | 1/1992 | Wang . |
| D. 333,610 | 3/1993 | Oshry et al. . |
| 1,287,842 | 12/1918 | Betts . |
| 4,263,357 | 4/1981 | Holson . |
| 4,327,831 | 5/1982 | Inaba et al. . |
| 4,508,366 | 4/1985 | Brindle . |
| 4,602,447 | 7/1986 | Feingold . |
| 4,778,047 | 10/1988 | Lay . |
| 4,844,260 | 7/1989 | Jaw ......................................... 206/311 |
| 4,850,731 | 7/1989 | Youngs . |
| 4,906,057 | 3/1990 | Davi et al. . |
| 5,154,284 | 10/1992 | Starkey . |
| 5,176,250 | 1/1993 | Cheng . |
| 5,295,577 | 3/1994 | Minter . |
| 5,307,926 | 5/1994 | Mee . |
| 5,392,906 | 2/1995 | Taniyama . |
| 5,392,913 | 2/1995 | Merrick . |
| 5,415,291 | 5/1995 | Fukagawa . |
| 5,520,279 | 5/1996 | Lin . |
| 5,555,977 | 9/1996 | Oshry et al. . |
| 5,697,498 | 12/1997 | Weisburn et al. ..................... 206/308.1 |
| 5,715,937 | 2/1998 | Oshry et al. . |
| 5,749,464 | 5/1998 | Cheris et al. ......................... 206/308.1 |

*Primary Examiner*—Paul T. Sewell
*Assistant Examiner*—Luan K. Bui
*Attorney, Agent, or Firm*—Thompson Hine & Flory LLP

[57] ABSTRACT

For storage of disc media (DM(18)) or associated literature (DML(20)), a sleeve (10) having two storage pockets (16) formed between two cover plates (14) and a substrate (12). The sleeves (10) may be mounted on a spine (48) having a plurality of vertebrate (50) connected by flexible hinges (55). The sleeves (10) and spine (48) may be stored in a clam-shell style case (66), or loose sleeves (10) may be stored in a tray (86). An alternate storage system (110) has a storage housing (112) and storage modules (114) each having an attachment mechanism (116). Each storage module (114) may have twosome combinations of DM pockets (168) or a generic pocket (170).

10 Claims, 8 Drawing Sheets

DETACHABLE MODULE DISC AND FLAT OBJECT STORAGE SYSTEM

This application claims the benefit of U.S. Provisional application Serial No. 60/009,597, filed Jan. 04, 1996, abandoned.

TECHNICAL FIELD

The present invention relates generally to storage systems for providing protection for and access to generally planar objects, and more particularly to units for storing and displaying disk shaped storage media. The preferred embodiment of the present invention is particularly adapted to space saving yet highly accessible storage of such disc storage media, and associated similarly sized literature, in an easily transportable manner separate from any of the associated cases in which such are typically sold. Further, multiple instances and modular assemblies of the invention are easily combined as desired into larger assemblies, permitting easy expansion of overall storage capacity.

BACKGROUND ART

One of the most popular forms of recording information today is on various disk shaped media. For purposes of the following, the term disc media (and the abbreviation "DM") is used in a generic sense to include music compact discs, CD ROM computer media, digital video discs, laserdiscs, computer floppy discs, floptical discs, and similar relatively flat data storage media. DM today use laser-based or magnetic inscription and reading technology to store a vast amount of information in relatively small space. Particularly widespread forms of DM are music compact discs and computer CD ROMs. Typically one side of MD is inscribed with recorded information (hereinafter termed the data information side), while the other side is marked with human readable information in either textual or pictorial form to identify the DM and its contents to users (hereinafter termed the user informative side).

With the proliferation of the DM as a means of information storage, a need has come for storage of a multitude of DM units. Further, since many types of DM are not alterable by end users (e.g., music compact discs), it has become typical practice for users to maintain libraries of DM, and today it is not uncommon for some such user libraries to contain hundreds of DM units.

As the popularity of DM has grown it has also become common to include small printed pamphlets or booklets which describe the DM contents, instruct on the use and preservation (particularly if the DM is used to store computer data), or provide DM content related information (e.g., a limited biography of the band whose music is recorded on a music DM). It therefore follows that attendant with the proliferation of the DM there has developed a need for storage of such DM related literature ("DML"), often preferably in the same library as the associated DM units themselves, and even more preferably in a manner which denotes specific individual DM to DML associations.

Many DM and DML are contained within bulky storage cases when purchased by consumers (e.g., jewel boxes for music compact discs). Many library storage methods retain the bulky original container, despite the fact that it is far more bulky than the contained DM and any associated DML. As DM libraries grow, many users are impressed with a need for reducing storage space requirements, and there have been various attempts at alternate storage systems. Unfortunately, such systems have suffered from a number of limitations which have limited their acceptance. As with any library storage system, users seek improved accessibility, index ability, aesthetics, and reduced cost. Comprehensive library storage is also increasingly important. For example, most outside-of-the-original-container storage systems have not included provision for storage of DML, and particularly lacking has been systems which store associated DML in a readily accessible manner with particular DM units which accompanied it at the time of purchase.

Another user concern is that most prior art systems have not included provision for easy storage expansion in convenient increments (e.g., many storage systems have a module capacity of 5, 10, or 12—requiring that capacity be incremented by 5, 10 or 12 units when storage for only one or two additional units is really needed).

Further, as society as become increasingly mobile and as DM data information retrieval equipment has grown smaller and more portable, transportability and robustness of library storage systems have become increasingly important.

Thus, while some prior art systems have addressed some of the above concerns, none have suitably addressed them all, and today there remains a need for improved DM and DML storage systems.

DISCLOSURE OF INVENTION

Accordingly, it is an object of the present invention to provide a system for storing an intermediate number of either disk media ("DM"), associated compact literature ("DML"), or combinations thereof.

It is another object of the present invention to store individual DM units and DML without the bulky containers in which they usually are purchased, in a manner which makes them readily accessible and visible for selection purposes.

It is another object of the present invention to provide a storage system for DM and DML which is esthetically pleasing both from a visual standpoint and from a tactile standpoint.

It is yet another object of the present invention to provide a storage system in which single handed manipulation permits the user to flip through the library selection in a rapid and predictable fashion.

Briefly, one preferred embodiment of the present invention is a sleeve for storing and displaying a pair of disk shaped discrete objects or similarly sized associated literature. The sleeve has substrate plate enclosed by a pair of cover plates, to form a pair of storage pockets suitable for accepting and compressibly retaining two stored objects. The sleeves mount onto a mounting track which parallels the edge used for mounting of the sleeve.

The sleeves are particularly suited for attachment to a spine, for storing and displaying a number of the above sleeves. The spine has a number of vertebrae, each of which have suitable mounting tracks to accept sleeves. The vertebrae are sequentially attached by hinges so that the sleeves once mounted and can be moved in the manner of pages of a book.

Briefly, a second preferred embodiment of the present invention is a storage module for storing and displaying pairs of disk shaped objects and similarly sized associated literature. The storage module includes an inner plate mounted between a pair of rims and a pair of cover sheets, thereby forming a pair of pockets suitable for accepting and compressibly retaining two of the objects. The storage modules each have mounting features, for mounting at one edge to an external housing.

An advantage of the present invention is that individual DM and DML are readily and sequentially displayed for viewing and access to the user.

Another advantage of the present invention is that the user informative sides, i.e., the entire labels of music compact discs (regardless of the rotational orientation) or the entire cover sheets of DML are presented and made visible to the user for ready viewing and access.

Another advantage of the present invention is that the structure can be single handedly manipulated by the user for rapid, convenient, and predictable sequential viewing of the contents.

Another advantage of the present invention is that the components may be modularly constructed for economy of manufacture and uniformity of structure.

Another advantage of the present invention is that it is readily adapted for usage with a large number of DM units and DML, if desired. In particular, the invention may be initially constructed to accommodate large numbers of DM units, or it may be made to easily permit expanding storage capacity. Such capacity expansion may be accomplished either by adding additional modular sections to individual instances of the inventive storage system, or by combining instances of the invention together to form a larger overall storage scheme.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODES FOR CARRYING OUT THE INVENTION

Figure 1:
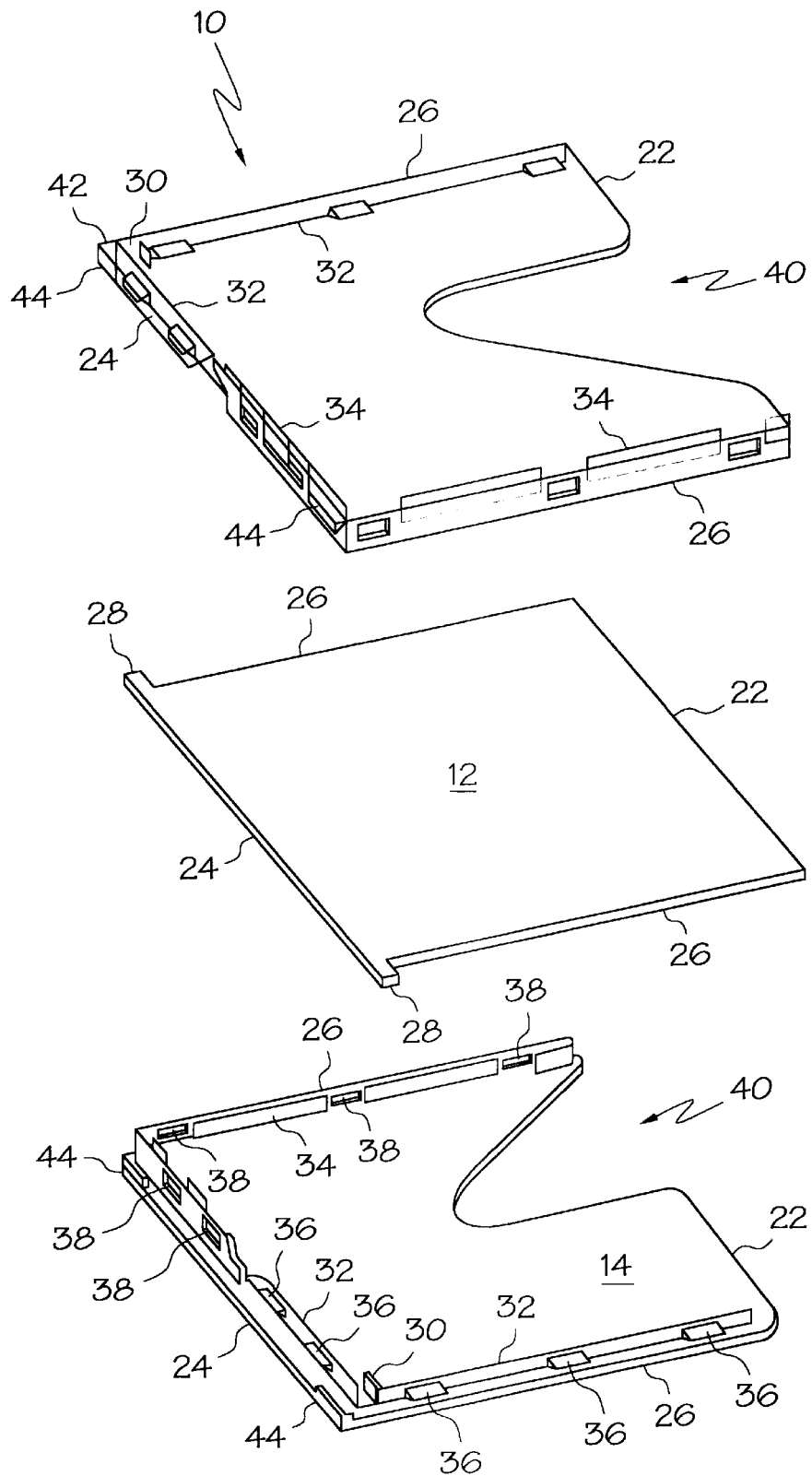
FIG. 1 is an exploded perspective view of a sleeve used in a first embodiment of the inventive storage system.

A first preferred embodiment of the present inventive sleeve style storage system for disk media ("DM"; used for both singular and plural here) and associated compact literature ("DML") is illustrated in FIG. 1 through FIG. 4, and particularly in the view of FIG. 1. This preferred embodiment of the invention is depicted by the general reference character 10.

FIG. 1 illustrates in exploded perspective view one instance of the inventive sleeve 10, included in which are a substrate 12 and two cover plates 14. When the sleeve 10 is assembled (see e.g., FIG. 2), two storage pockets 16 are formed which are each suitable for insertion of a DM 18 or a DML 20 (neither shown in FIG. 1; see e.g., FIG. 6).

The substrate 12, the cover plates 14, and the storage pockets 16 are all roughly rectangular in shape, and all accordingly can be defined as having an entry edge 22, which is that at which a DM 18 or DML 20 is inserted; a back edge 24, opposite the entry edge 22; and a pair of side edges 26.

In the preferred embodiment the substrate 12 has a key additional feature, a pair of retention ears 28, one located on each side edge 26 proximate to the intersection with the back edge 24. When the sleeve 10 is assembled, the two retention ears 28 engage with a pair of retention recesses 30, one each in the sandwiching cover plates 14, in a manner such that the substrate 12 is captured and can not escape from between the cover plates 14, even as users repeatedly slide DM 18 and DML 20 into and out of the storage pockets 16. Of course other methods for retaining the substrate 12 in place are possible. For example, in another embodiment described below, gluing a substrate into place is possible. And, other alternate systems are easily envisioned, for instance ones using additional numbers of ears or ones having ears located elsewhere along the side edges 26.

In the presently preferred embodiment the cover plates 14 are all the same, and have a system of engaging tongues 32 and grooves 34 provided around both the back edge 24 and the side edges 26. The particular arrangement of the tongues 32 and grooves 34 is not critical, so long as that when two cover plates 14 are assembled the respective tongues 32 of each mate with the respective grooves 34 of the other. Alternate methods of assembling the cover plates 14 together are also acceptable. For example, sonic staking or welding methods, perhaps using dissimilar cover plates.

Returning to the preferred embodiment, it is particularly the dimensions of the tongues 32 and grooves 34 which ultimately determine the thickness of the sleeves 10. Since it is desirable to be able to slightly compressibly hold a DM 18 in a storage pocket, the tongues 32 and grooves 34 are suitably dimensioned. (The thickness of a particular type of DM 18 is the basis for this since that is standardized and known, unlike thickness of DML 20).

A locking system is needed to retain the cover plates 14 together once they are engaged during assembly. In the preferred embodiment the tongues 32 have a series of locking notches 36 provided, and the grooves 34 have a corresponding series of locking holes 38 provided. During assembly, as the tongues 32 are engaging with the grooves 34, the locking notches 36 engage with the locking holes 38 and thereby lock the cover plates 14 of the sleeve 10 together. Of course other methods of locking cover plates together are acceptable for other embodiments of the invention, for example gluing or the previously discussed sonic welding.

The substrate 12 is preferably made of a non-scratching type material, with the intention being that a DM 18 may be inserted into a storage pocket 16 with any exposed data information side adjacent to the substrate 12, to protect the critical data thereon. This also orients the user information side of the DM 18 outward, which has particular benefit described below. In the preferred embodiment the inventors use a soft material to obtain the non-scratch nature of the substrate 12. However, other methods of accomplishing this goal are also suitable. For example, a high degree of surface polish or a material with very low surface friction could alternately be used.

It should be noted that the preferred material for the cover plates 14 need not be the same as that of the substrate 12, since presently available DM 18 usually have only one exposed data storage side, and that will commonly be placed adjacent to the substrate 12. However, to obtain greatest benefit, the inventors do prefer that the cover plates 14 be made of transparent material (e.g., plastic). In this manner a user may easily read all of the user information side of a DM 18 or the outside of DML 20 which is stored in a sleeve 10. To a somewhat lessor degree it is also preferable that the substrate 12 be made of an opaque material, so that users may readily discern whether a topmost storage pocket 16 is occupied, without possibly seeing through into a lowermost storage pocket 16 which is occupied.

An optional, but highly desirable feature in each cover plate 14 is an access slot 40. This provides a means for a user to easily withdraw a DM 18 or DML 20 from a storage pocket 16. The access slot 40 should extend into a cover plate 14 deep enough that a user can easily get their fingertip into any center hub hole of a DM 18 which is stored in a storage pocket 16, for adequate purchase to remove the DM 18. However, an access slot 40 should not be so deep that overall structural rigidity of the sleeve 10 is seriously reduced.

Figure 2:
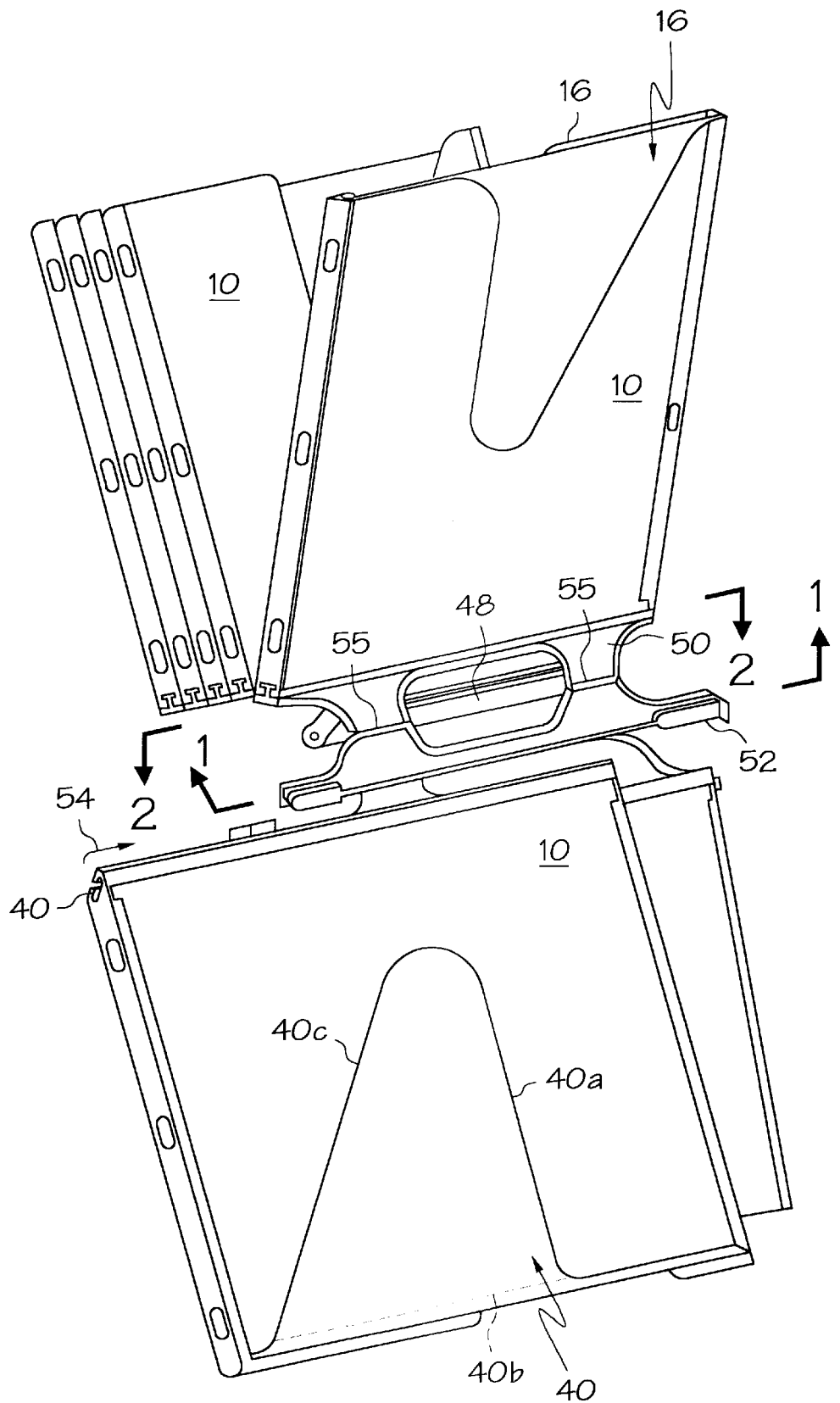
FIG. 2 is a perspective view of a number of the sleeves of FIG. 1 mounted on vertebrae of a spine, with FIG. 2a a detailed view of section 1—1 in FIG. 2 and FIG. 2b a detailed view of section 2—2 in FIG. 2.

Considerable variation in the shape of an access slot 40 is possible. FIG. 1 and 2 show the shape which is most preferred by the inventors, roughly a right-triangle shape for right-handed users. A first triangle side 40a (FIG. 2) parallels a side edge 26 of the cover plate 14 (typically a distal or right edge relative to a user), a second triangle side 40b (shown with a dashed line in FIG. 2) falls on part of the entry edge 22 of the cover plate 14, and a triangle hypotenuse 40c is formed as shown in FIG. 2. As can be appreciated by viewing FIG. 1 and 2, this shape and orientation of the access slot 40 will usually be optimal for a right-handed user, and also has a high degree of aesthetic appeal. Further, use of this relatively wide opening triangular access slot 40 has a number of manufacturing benefits. Less material is needed to manufacture the cover plates 14, and since the typical manufacturing method will be molding, less molding pressure is needed. The molding press pressure required in a given case is a function of the surface area of the part being produced. The inventors have found that use of the particular access slot 40 described herein, for sleeves 10 suitable for compact disk type DM 18, has permitted manufacture of the cover plates 14 on a one-size-smaller industry standard press than would be required if a narrower type access slot were used (i.e., than if the cover plate 14 had a greater surface area).

An important feature of the sleeve 10 is optional mountability. As depicted in FIG. 1, each cover plate 14 includes an extended region 42 alone its back edge 24, and also has at least one mounting tang 44 at its extreme back edge 24. As can be appreciated from FIG. 2, when two cover plates 14 are assembled into a single sleeve 10 a mounting slot 46 is formed along the back edge 24 of the sleeve 10. Only one mounting tang 44 per cover plate 14 may be used, for instance a long one extending the entire length of each back edge 24 of the cover plates 14, or a smaller one centered on each back edge 24 of the cover plate 14. However, in the preferred embodiment the inventors use two mounting tangs 44, located at opposite ends of the back edge 24 of each cover plate 14. This provides four mounting tangs 44 on each sleeve 10, two in opposition at each end of the mounting slot 46, and thus adequate strength and mounting stability is achieved.

FIG. 2 illustrates a number of the inventive sleeves 10 mounted on a spine 48. The spine 48 has a number of vertebrae 50, each containing a mounting track 52. Each sleeve 10 engages a corresponding vertebrae 50 by sliding the mounting slot 46 over the mounting track 52, in the manner depicted by arrow 54. The vertebrae 50 are attached in a series, with one (preferably a central one) attached to the spine 48. In the preferred embodiment, where plastic is the material of construction, the method of attachment of the vertebrae 50 is a flexible hinge 55 (also sometimes referred to as a "piano hinge"). This imparts a key benefit whereby a series of mounted sleeves 10 can be accessed in a roll-and-tumble manner by a user for DM 18 or DML 20 selection. This roll-and-tumble action is analogous in many ways to how pages can be turned in a book, with puling of one page turning sequential pages merely by forces transferred through the book spine. It should particularly be noted that the sleeves 10 have no direct attachment to one another. The sleeves 10 attach to the vertebrae 50, which in turn are attached to the spine 48. In visual appearance operation here somewhat resembles that of common card files (e.g., those sold under the ROLODEX trademark), but the manner of operation is quite different.

Figure 2A:
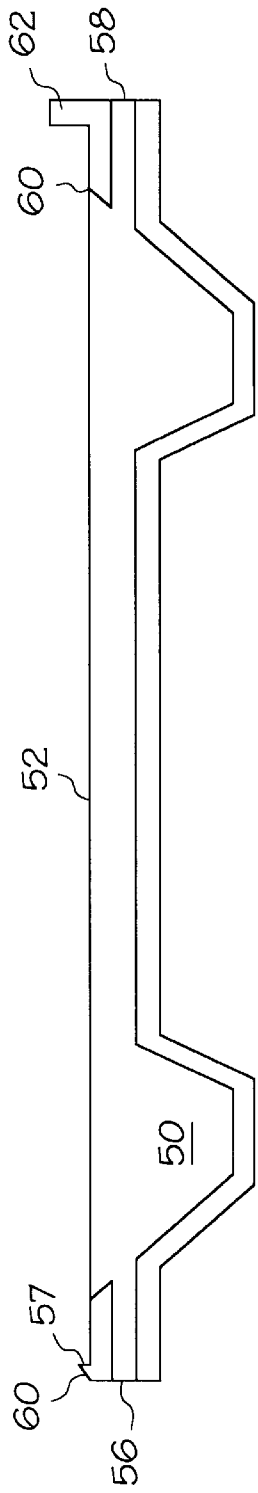

FIG. 2a is a view of section 1—1 in FIG. 2 which depicts particular details of an empty mounting track 52. The mounting track 52 has both an entry end 56 and a stop end 58, each of which has a leading taper 60 to permit easy engagement with the mounting slot 46 of a sleeve 10. The entry end 56 includes an upward depending stop dimple 57, to assist in retaining a mounted sleeve 10 on a mounting track 52. Further, the stop end 58 includes a stop tab 62, to prevent a mounted sleeve 10 from sliding too far along the mounting track 52.

Figure 2B:
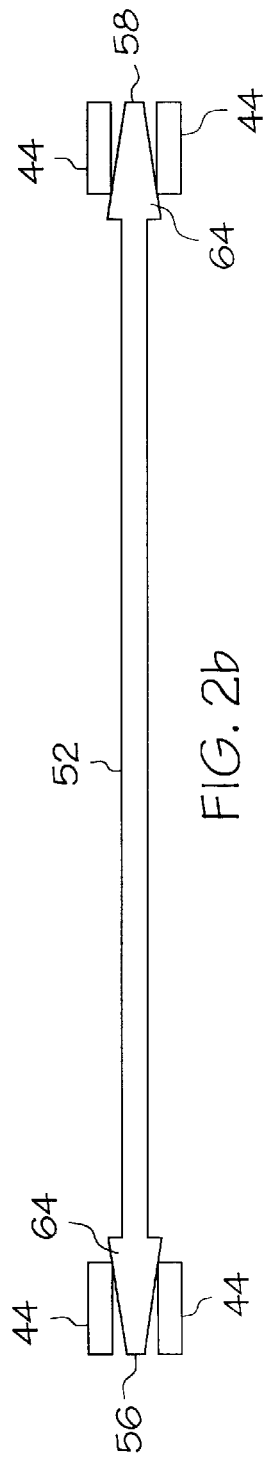

Retention of the sleeves 10 on the vertebrae 50 of the spine 48 can be provided in a number of manners. As noted above, the stop dimple 57 contributes to this goal. Another method is to have a slight interference fit between the entire mounting track 52 of the vertebrae 50 and the mounting tangs 44 of the sleeve 10. And yet another method is to have depressions to accept the mounting tangs 44 in a snap-in manner, say at the stop end 58 of the mounting track 52. However, as depicted in FIG. 2b, of section 2—2 of FIG. 2, the preferred embodiment of the mounting track 52 instead uses ramped regions 64 at both ends of the mounting track 52. These ramped regions 64 are opposed, and make the mounting track 52 narrowest at its extremes. The ramped regions 64 partially form interference fits with the mounting tangs 44 of the sleeves 10 in the manner shown, thereby somewhat centering and further causing a mounted sleeve 10 to be held firmly in position upon a mounting track 52.

In the preceding, the back edge 24 of the sleeve 10 has been that described as having the mounting slot 46. Those skilled in the art will readily appreciate that either of the side edges 26 could have the necessary features provided (e.g., the extended region 42 and mounting tangs 44), and the sleeve 10 could then be mounted accordingly.

Figure 3A:
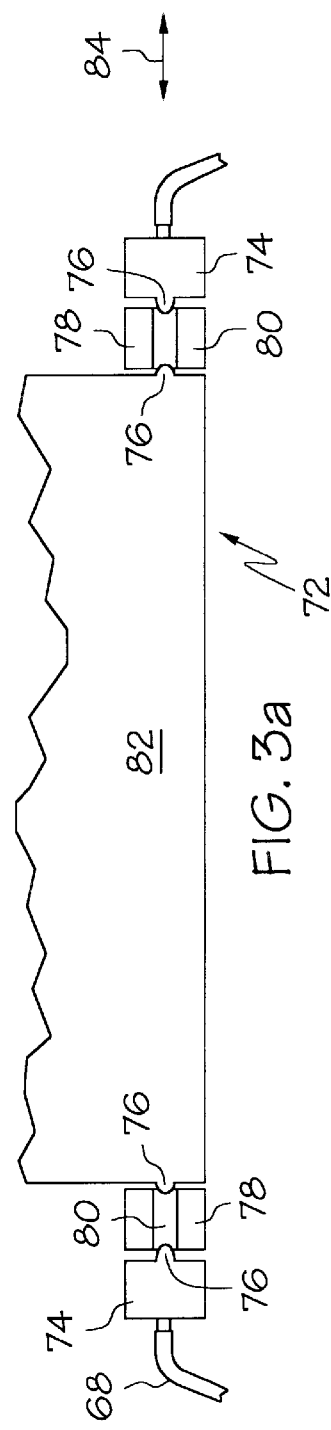
FIG. 3 is a perspective view of a clam-shell style case for storage of the spine and sleeves assembly of FIG. 2, with FIG. 3a a detailed view of section 1—1 in FIG. 3.
Figure 3:
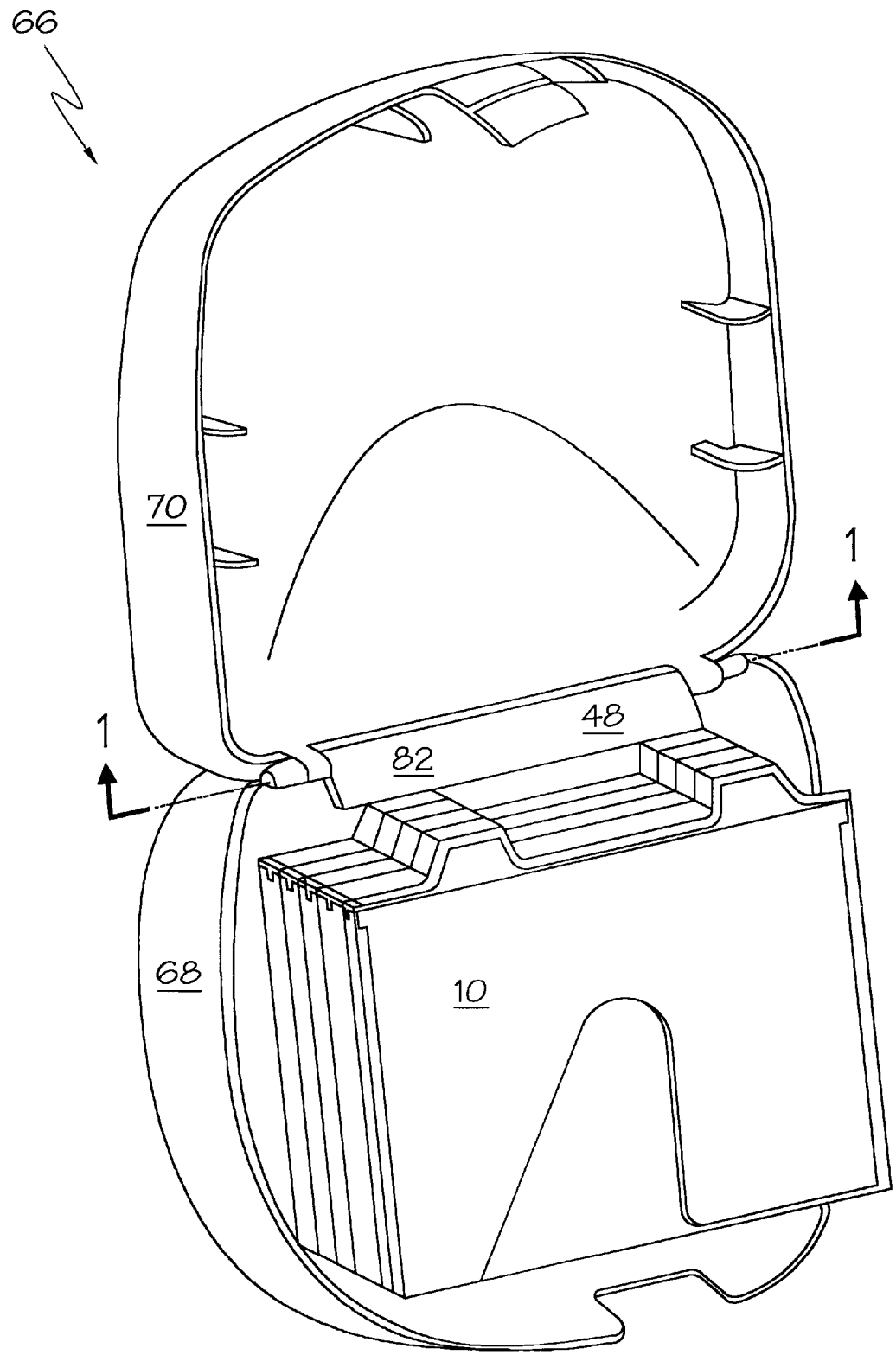

FIG. 3 depicts one type of container suitable for storage of the inventive sleeves 10, a clam-shell type case 66 having a bottom case section 68 and a top case section 70. The case 66 accepts the spine 48 of FIG. 2, and permits easy and protected transport of a multiplicity of the sleeves 10 in a very compact yet highly protected manner. Typical desirable increments of sleeves 10 which can be stored in this manner are 5, 8, 10, 12, 20, and even more. Accordingly, cases 66, such as that shown in FIG. 3, can be designed to accept appropriately sized spines 48. In the preferred embodiment the spine 48 is made part of a hinge assembly 72 of the case 66.

FIG. 3a, depicting section 1—1 of FIG. 3, shows particular details of this hinge assembly 72. The bottom case section 68 has provided two outer hinge teeth 74, each having a dimple 76 which is inward depending. The top case section 70 has provided two middle hinge teeth 78, each having a through bore 80. The spine 48 has an inner hinge tooth 82, which has two opposed dimples 76 which are outward depending. The dimples 76 here act much in the manner of a conventional hinge pin. They engage the through bores 80 of the middle hinge teeth 78 to hold all of the teeth (outer hinge teeth 74, middle hinge teeth 78, and the inner hinge tooth 82) in rotatable alignment about axis 84. Since plastic is the preferred material for construction of the case 66, use of the dimples 76 (rather than a conventional hinge pin, for example) permits easy snap-together assembly and disassembly of the case 66.

Figure 4:
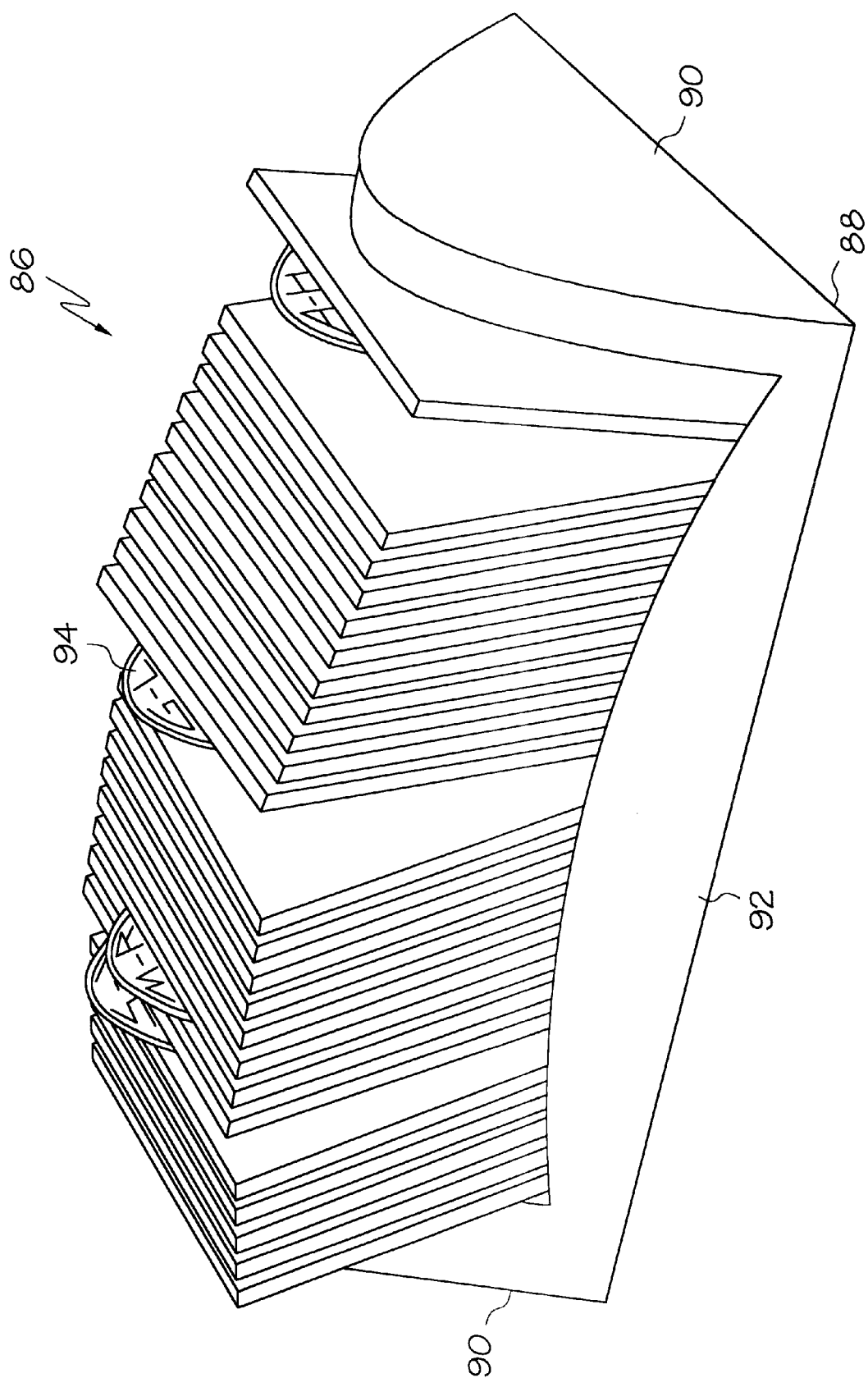
FIG. 4 is a perspective view of a tray style storage unit for loose storage of the sleeves of either FIG. 1 or FIG. 7.

FIG. 4 depicts another container suitable for storage of the inventive sleeves 10, a tray 86 which is suitable for loose storage and display of a multiplicity of sleeves 10. The tray 86 has a base 88, end walls 90 and side walls 92. The base 88 may optionally have an upward arc shape (as shown in FIG. 4) to also permit users an easy roll-and-tumble type access to sleeves 10 stored in the tray 86. Optional indexing separators 94 may also be provided. It should be noted that this tray 86 is also quite appropriate for use with the storage modules 114, described below.

Alternate Embodiment

Figure 5:
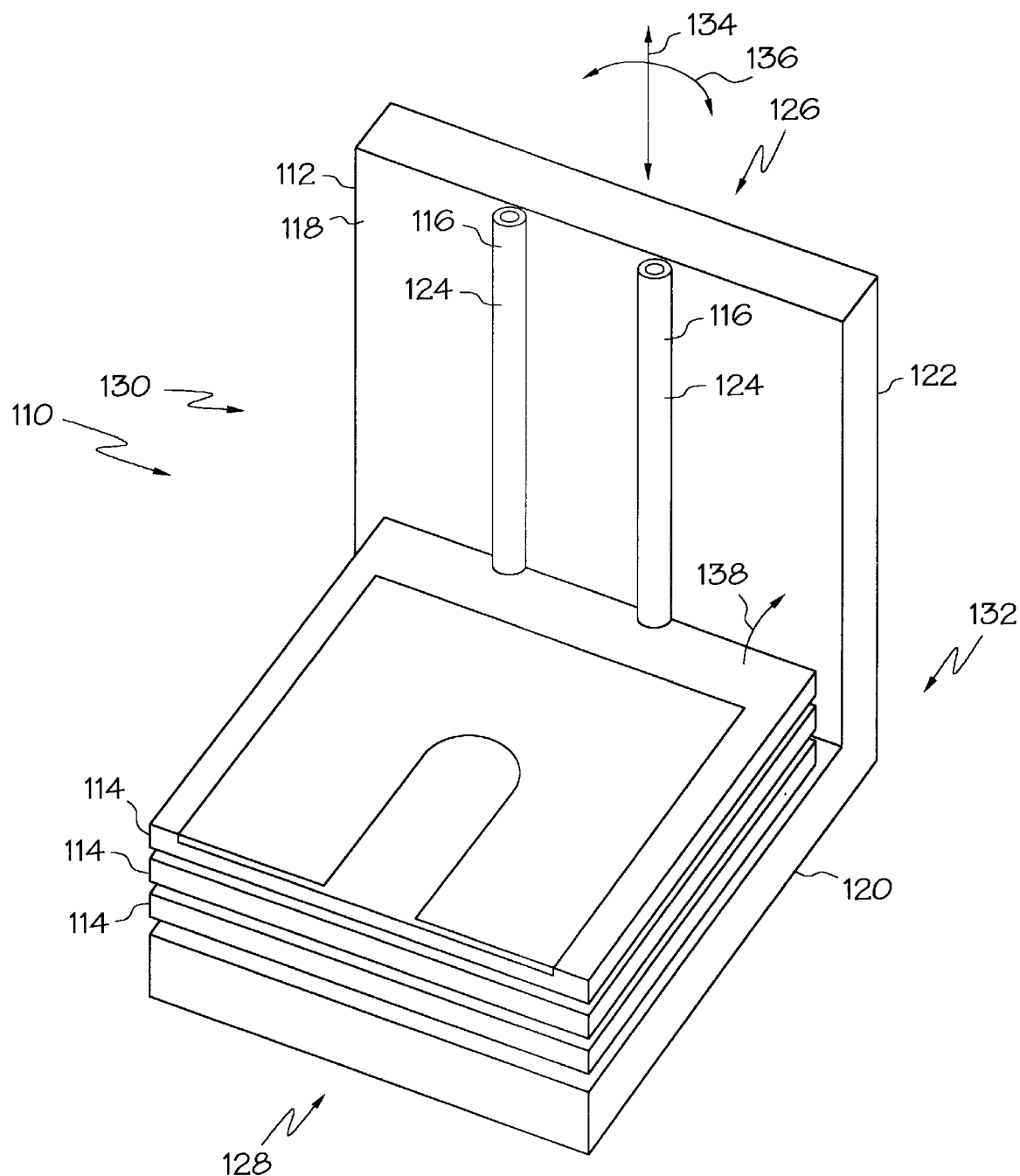
FIG. 5 is a perspective view of a complete second embodiment of the inventive storage system.
Figure 6:
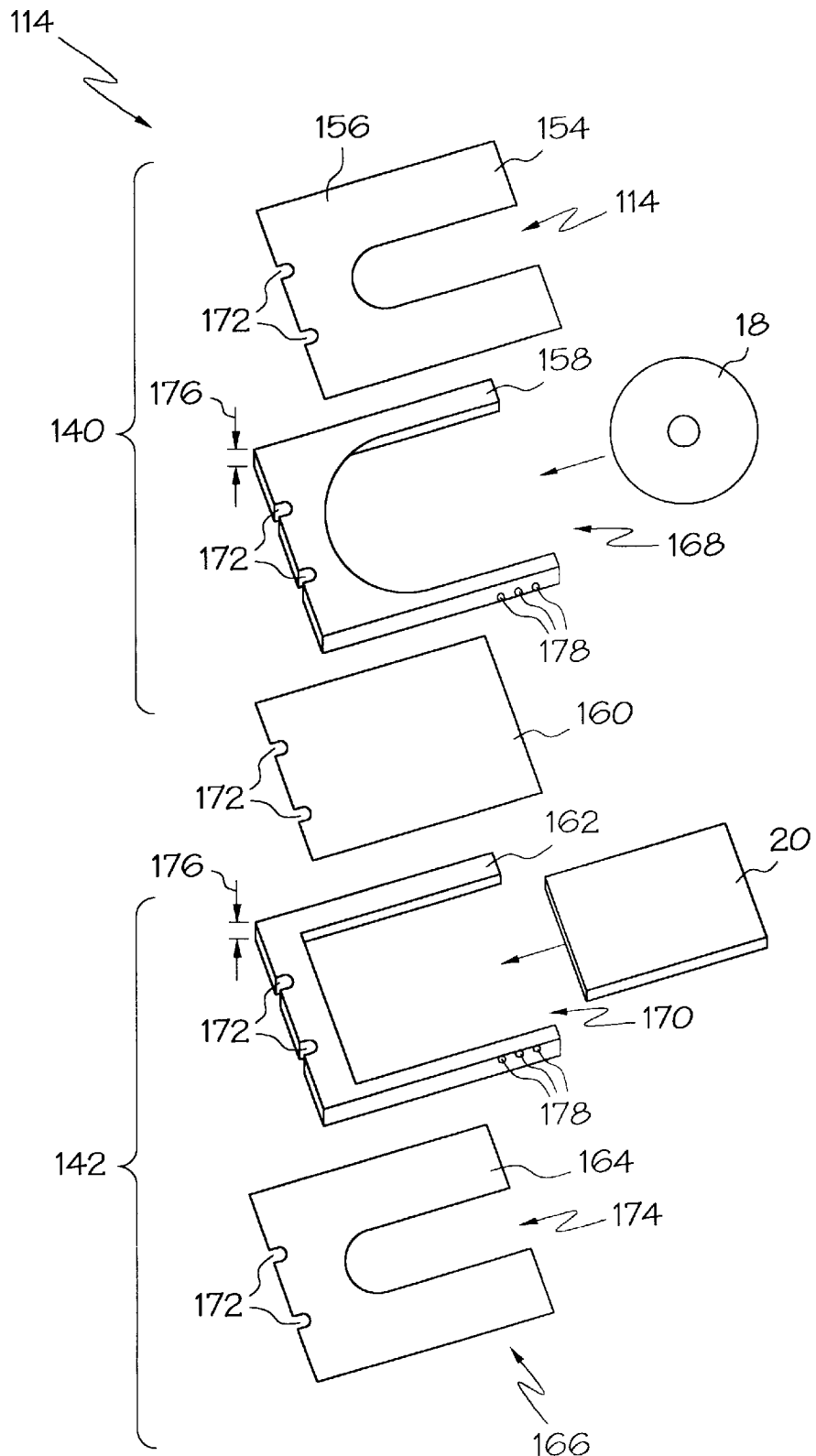
FIG. 6 is an exploded view of a storage module for use in the second embodiment of the storage system; and, FIG. 7 is a view of the storage module of FIG. 6 once assembled.
Figure 7:
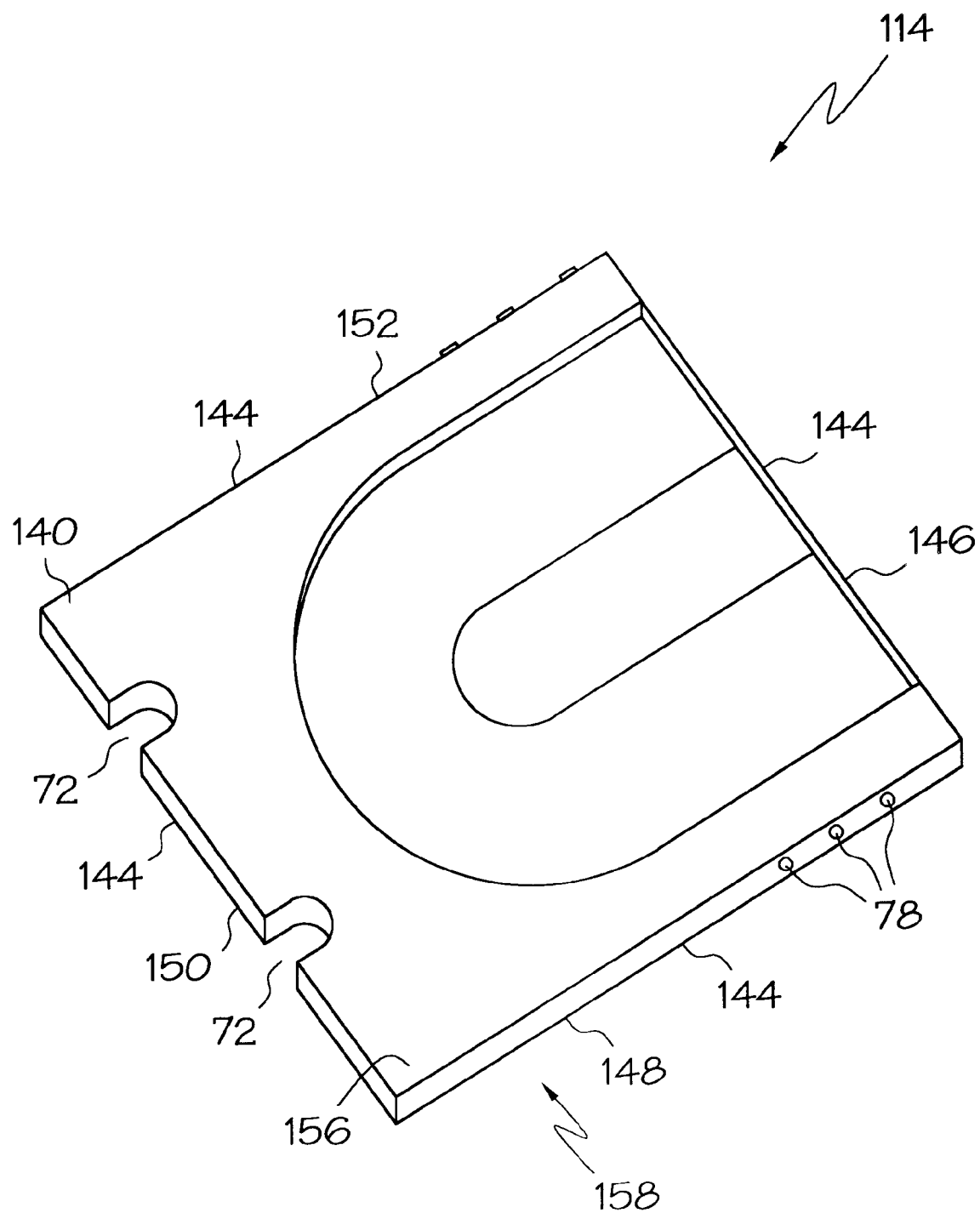

An alternate preferred embodiment of the present inventive storage system for DM and associated DML is illustrated in FIG. 5 through FIG. 7, and particularly in the view of FIG. 5. This preferred embodiment of the invention is depicted by the general reference character 110.

FIG. 5 illustrates the two basic components of the inventive storage system 110, a storage housing 112 and a number of storage modules 114. The storage housing 112 has an attachment mechanism 116, for holding the storage modules 114 in or on the storage housing 112. In FIG. 5 the storage housing 112 is depicted as an L-shaped rack 118 having a stop member 120 (analogous here to the base of the "L"), a backing member 122 (analogous to the upright of the "L"), and two module mounting rails 124. The rails 124 extend from the stop member 120 to roughly an open end 126 of the rack 118. Due to the rails 124 being fixed onto the rack 118, they are held in fixed relationship to one another. For purposes of discussion the storage housing 112 in FIG. 5 is defined as having a front side 128, a left side 130 and a right side 132.

In the vertical orientation of FIG. 5, depicted by an arrowed vertical axis 134, gravity causes the storage modules 114 to rest upon the stop member 120. This accordingly puts the open end 126 at the top. However, vertical orientation is not necessary. For example, two instances of this embodiment of the storage system 110 can be mounted together horizontally in a manner such that the respective open ends 126 abut (forming a large square cornered U-shape, and actually making "open" in such an arrangement a misnomer). Such an arrangement prevents storage modules 114 from sliding off of the rails 124 at the open ends 126. Of course, another way to "close" the open end 126 is to simply add another stop member 120 there, also making the storage housing 112 U-shaped, and the inventors in fact anticipate that many embodiments of the storage system 110 will be constructed in this form. The storage system 110 lends itself to considerable variation in construction, described further below, which facilitates many possible such orientations in most possible situations.

A number of the elements of the storage housing 112 are mere matters of design preference. For example, the rack 118 in FIG. 5 is L-shaped. However, as noted, a sharp cornered U-shape would be equally acceptable. The storage housing 112 might also be made tray shaped (see e.g., FIG. 4), closed on all sides except one. Or, a tray with a door may be used, closing all sides. Further, there is no reason that the elements of the storage housing 112 necessarily be generally linear. For example, the stop member 120 may be shaped in any desired manner, its major function being merely to provide a point against which the storage modules 114 may come to rest, either due to gravity as in FIG. 5 or by some other means. In some embodiments (such as the "bobbin," described below) stop members 120 may be omitted entirely, and in others multiple stop members 120 might be provided. Highly desirable shapes for some applications are ones where the backing member 122 (e.g., the upright of the L-shaped rack 118 of FIG. 5) or the base of a "U" or tray is arced to open the "L," "U," or tray. This principle can even be extended to the point that the "L" or "U" become "O" shaped, or until a tray becomes bobbin or spool shaped.

The attachment mechanism 116 is also subject to considerable design variation, without affecting the spirit of the storage system 110. For example, FIG. 5 depicts two mounting rails 124 being used as the attachment mechanism 116. However, a single rail 124 could also work, although this might not hold the storage modules 114 as stable as be desired, permitting them to rotate or rock somewhat in the directions depicted by arrow 136, particularly if the tolerances between the single rail 124 and the storage modules 114 were made loose or if wear were to occur. In contrast, three or more mounting rails 124 could be used also, but this would add little increased storage module 114 rotational stability or other benefit over the two mounting rails 124 system in the embodiment depicted in FIG. 5. Further, the attachment mechanism 116 need not be constructed of rails 124. A system of one or more rods would be equally suitable. Finally, while the discussion above has used the terms "rail" and "rod," these terms have been used in a very general sense. Terms like lip, tongue, protrusion, wire ring, etc. are considered by the inventors as encompassed within the more generic terms used herein for the attachment mechanism 116.

Operation of the embodiment depicted in FIG. 5 is effected by a user tilting some or all of the generally flat planar storage modules 114 upward as depicted by rotational arrow 138. This presents major surfaces of the storage modules 114 for viewing. Releasing the storage modules 114 permits them to drop back down under the influence of gravity, and much like "fanning" the pages of a book or a card index, a user may selectively slowly release individual storage modules 114 to selectively view their surfaces. Since the individual storage modules 114 permit viewing of their contents as well, this flipping or fanning operation permits convenient selection from amongst a library of DM and DML stored in the storage system 110. Embodiments of the storage system 110 may, of course, be rested for use horizontally on the backing member 122, in which case the operation of the invention becomes somewhat analogous to that of a conventional card file (e.g., card files sold under the ROLODEX trademark; note, when the backing member 122 is arced or round in shape, this analogy becomes even stronger).

FIG. 6 illustrates the preferred embodiment of the storage module 114 in an exploded view. Two general options are included within the storage module 114, a DM option 140 suited for insertion and storage of disk shaped DM 18 only, and a generic option 142 suited for insertion and storage of either a DM 18 or some DML 20 (with square shaped DML 20 depicted here). Each storage module 114 preferably has two instances from among these options, although embodiments with only one instance are possible. It is entirely a matter of design choice how these options are combined. For example, DM options 140 may be provided on both sides of a storage module 114, or generic options 142 may be used on both sides, or a DM option 140 on one side and a generic option 142 on the other side may be used to make a combination storage module 114, as is depicted in FIG. 6. The inventors prefer the combination storage module 114 version, since it permits pairing of one DML 20 with one DM 18 in each storage module 114; thus clearly, logically, and intuitively associating that DML 20 with that particular DM 18.

Referring now to FIG. 7 also, which shows the assembled storage module 114 of FIG. 6, for purposes of discussion the edges 144 of the storage module 114 are defined thus: the edge 144 where DM 18 or DML 20 are inserted into the storage module 114 is the entry edge 146, and the remaining edges 144 are a first edge 148, a second edge 150 (opposite the entry edge 146), and a third edge 152 (opposite the first edge 148).

Proceeding now from the top to the bottom of FIG. 6, the exploded depiction there includes a first cover sheet 154 (forming a top module surface 156, see also FIG. 7), a DM rim 158, an inner plate 160, a generic rim 162, and a second cover sheet 164 (forming a bottom module surface 166, see again FIG. 7). When this "sandwich" of components is assembled, the storage module 114 has formed therein a DM pocket 168 (suitable for storing only a DM 18), and a generic pocket 170 (suitable for receiving and storing either a DM 18 or DML 20). All of the major elements here have matching attachment notches 172, which when the storage module 114 is assembled make it suitable for engagement with the attachment mechanism 116 in the storage housing 112 of the storage system 110. Since the attachment notches 172 play a key role in operation of the storage system 110 they are described further below.

The first cover sheet 154 has an optional finger slot 174, to facilitate withdrawal of a DM 18 stored in the DM pocket 168. Similarly, the second cover sheet 164 also has an optional finger slot 174, to facilitate withdrawal of a DM 18 or DML 20 stored in the generic pocket 170. In the preferred embodiment the first cover sheet 154 and the second cover sheet 164 are both made of transparent material (e.g., plastic) to facilitate viewing any information printed on a DM 18 stored inside the DM pocket 168 or generic pocket 170, or any DML 20 stored inside the generic pocket 170. Since the entire first cover sheet 154 and second cover sheet 164 are preferably transparent, the rotational orientation of a DM 18 stored within either the DM pocket 168 or the generic pocket 170 does not adversely affect viewing. Similarly, DML 20 (which are presumably rectangular or square) may be rotated in ninety degree increments before insertion into the generic pocket 170, again without changing basic view ability of the stored DML 20 (readability due to non-optimal orientation being another matter, e.g., text upside down relative to a reader).

The DM rim 158 is made of suitable thickness 176 such that the DM pocket 168 formed in the assembled storage module 114 closely holds an inserted DM 18. Similarly, the generic rim 162 is preferably made to be the same thickness 176. Since the generic pocket 170 has the dual possible functions of holding either a DM 18 or DML 20, sizing the generic rim 162 to thickness 176 is considered to be best because the dimensions (including thickness) of a DM 18 are hard and fixed, while those of DML 20 are unknown and may be somewhat changeable by compression. Further, for embodiments of the storage module 114 where gravity may not adequately retain DM 18 and DML 20 inside the storage module 114, the DM rim 158 and the generic rim 162 may be constructed with thickness 176 thin enough that DM 18 and DML 20 are slightly compressibly held between the inner plate 160 and the respective first cover sheet 154 or second cover sheet 164. Yet another option for DM rims 158 and generic rims 162 is to make them of different colored material. In this manner a user may organize stacks or rows of the storage modules 114 so that when viewed from one of the edges 144 changes in color patterns reflect intentional demarcations within a library scheme.

Returning now to the attachment notches 172, FIG. 6 and 7 depict these as being located in the second edge 150 of the storage module 114. However, this is not a requirement, and for other embodiments attachment notches 172 may instead be placed in either the first edge 148 or the third edge 152, or multiple sets of attachment notches 172 may be placed in different edges 144. In this manner the entry edges 146 of storage modules 114 can be faced toward either the front side 128, left side 130, or right side 132 of the rack 118 in FIG. 5. This has obvious advantages for permitting flexible orientation of the storage system 110. For example, the storage system 110 could be laid down in a drawer, or put upright on a book shelf, with optimal access to the stored contents being configured by choosing which edge 144 with attachment notches 172 is used to engage the attachment mechanism 116. Another option for the attachment notches 172 is shaping and sizing them to snapably engage with the attachment mechanism 116 (analogizing to card index files also helps to visualize this concept). This helps a storage housing 112 retain the storage modules 114 in place despite considerable change in orientation, such as that commonly occurring with portable storage. To facilitate removal of storage modules 114 from such "snap-assemble" embodiments of the storage system 110, optional grip protrusions 178 may be added to the storage modules 114.

The inner plate 160 effectively bisects the storage module 114 between the top module surface 156 and the bottom module surface 166. In most embodiments it is anticipated that the surfaces of the inner plate 160 will be made soft to prevent scratching of the information bearing side of DM 18 stored in the storage modules 114. Accordingly, the most suitable materials for construction of the inner plate 160 will be either soft or highly polished. This of course pre-supposes that users "properly" insert DM 18 into DM pockets 168 and generic pockets 170. However, due to the use of transparent material for the first cover sheet 154 and the second cover sheet 164, insertion of DM 18 with the user information side outward should be relatively logical and intuitive.

Finally, while the preferred embodiment here uses the first cover sheet 154 and the second cover sheet 164 to retain DM 18 and DML 20 contents in the storage module 114, other retention systems are possible without departing from the spirit of the storage system 110. For example an inward curled lip (i.e., away from the proximate edge 144) could be used to keep DM 18 from falling out at the top module surface 156, or DM 18 or DML 20 from falling out at the bottom module surface 166. By suitable shaping and sizing of such lips they would be suitable to capture at points on three sides DM 18 and DML 20 within the storage module 114.

In addition to the above mentioned examples, various other modifications and alterations of the inventive sleeves 10, spines 48, and storage system 110 may be made without departing from the invention. Accordingly, the above disclosure is not to be considered as limiting and the appended claims are to be interpreted as encompassing the entire spirit and scope of the invention.

Industrial Applicability

The present sleeves 10 are well suited for application in storage of DM 18 and DML 20. The sleeves 10 alternately accept both types of contents interchangeably, thus serving a need for storage in which such contents can be associated as desired.

The sleeves 10 are compact in size relative to conventional point-of sale storage containers (e.g., jewel boxes) as well as many other prior art storage systems as currently used. This permits users of the inventive sleeves 10 greater storage "density" than is available with such prior art. This has particularly become of interest to users who have built up libraries of numerous DM 18 or DML 20, or users who seek to compactly transport a multiplicity of DM 18 and DML 20. When the sleeves 10 are used in concert with the spine 48 and vertebrae 50 assembly, or are stored in the tray 86, orderings of DM 18 and DML 20 can be made, thus effectively "indexing" a library of DM 18 and DML 20 if desired. Great durability and protection for spine 48 mounted sleeves 10 and their contents can further be had by containing them in the case 66.

Similarly, the present storage system 110 is also well suited for application in storage of DM 18 and DML 20. The storage modules 114 may also be constructed to accept both types of contents interchangeably or to accept them in association, thus filling a particularly desired storage need today. The storage modules 114 are also more compact in size than conventional point-of-sale storage, yet may be constructed to provide virtually equivalent protection to contents. Further, the storage modules 114 are similarly suitable for use in libraries, particularly when mounted in the storage housing 112.

All portions of the embodiments presented herein (e.g., sleeves 10, spine 48, tray 86, storage housing 112, and storage module 114) may be made of common and inexpensive materials. The inventors anticipate that plastic will be the primary material of choice, since some varieties of it are transparent and others are non-scratching relative to the anticipated DM 18 and DML 20 contents. Further, convention plastic molding techniques, combined with snap-together and sonic weld-together assembly (as described for the sleeves 10), or glue-together assembly (as described for the storage modules 114), are quite appropriate for constructing the present invention.

For the above, and other, reasons, it is expected that the present invention will have widespread industrial applicability, and it is expected that the commercial utility of the invention will be extensive and long lasting.

We claim:

1. A sleeve for storing and displaying a pair of discrete objects chosen from the set consisting of disk shaped storage media and similarly sized literature associated with such media, the sleeve comprising:
   a substrate plate;
   a pair of cover plates, suitable for capturing said substrate plate therebetween to form a pair of storage pockets suitable for accepting and compressibly retaining two of the objects;
   attachment means, for attaching said cover plates and said substrate plate together to form the sleeve;
   mounting means, for mounting the sleeve at a defined mounting edge onto a mounting track which parallels said mounting edge of the sleeve; and
   said mounting means is formed by at least one tang in each said cover plate which is positioned at said mounting edge such that said tangs of the sleeve grip said mounting track.

2. The sleeve of claim 1, wherein:
   said substrate plate is made of material suitably non-scratching to data stored on the object.

3. The sleeve of claim 1, wherein:
   said cover plates are made of material suitably transparent that a user may read the surface of the objects stored within said storage pockets.

4. The sleeve of claim 1, wherein:
   said attachment means is a member of the set consisting of locking tongues and grooves, sonic welding, and gluing.

5. The sleeve of claim 1, wherein:
   each said cover plate has defined an access slot, to provide users easy withdrawal of the object in said storage pocket of the sleeve.

6. A spine for storing and displaying a plurality of the sleeves of claim 1, the spine comprising:
   a plurality of vertebrae, each having a mounting rail suitable to accept the sleeve;
   hinge means attaching said vertebrae sequentially so that instances of the sleeves are mounted and can be moved in the manner of pages of a book.

7. The spine of claim 6, wherein:
   said vertebrae each have retention mean, to retain the sleeve when mounted thereon.

8. A sleeve for storing and displaying a pair of discrete objects chosen from the set consisting of disk shaped storage media and similarly sized literature associated with such media, the sleeve comprising:
   a substrate plate;
   a pair of cover plates, suitable for capturing said substrate plate therebetween to form a pair of storage pockets suitable for accepting and compressibly retaining two of the objects;
   each said cover plate has defined a mounting edge;
   attachment means for attaching said cover plates and said substrate plate together to form the sleeve; and
   mounting means for mounting the sleeve onto a mounting track which parallels an edge of the sleeve, wherein said mounting means is formed by at least one tang positioned at said each mounting edge such that said tangs of the sleeve grip said mounting track.

9. A storage system for storing and displaying a pair of discrete objects chosen from the set consisting of disk shaped storage media and similarly sized literature associated with such media, the system comprising:
   a plurality of sleeves, each sleeve including:
      a substrate plate;
      a pair of cover plates, suitable for capturing said substrate plate therebetween to form a pair of storage pockets suitable for accepting and compressibly retaining two of the objects;

attachment means for attaching said cover plates and substrate plate together to form the sleeve;

mounting means for mounting the sleeve at a defined mounting edge onto a mounting track which parallels said mounting edge of the sleeve;

a spine for storing said plurality of sleeves, the spine including:

a plurality of vertebrae, each having a mounting track suitable to accept one sleeve; and hinge means for hingeably attaching said vertebrae sequentially so that instances of the sleeves are mounted and can be moved in the manner of the pages of a book.

10. The system of claim 9, wherein said vertebrae each have retention means to retain the sleeve when mounted thereon.

* * * * *